Dec. 2, 1969   D. A. FISCHER ET AL   3,481,379
LOCK NUT
Filed Nov. 24, 1967
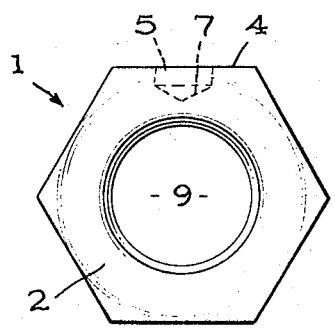
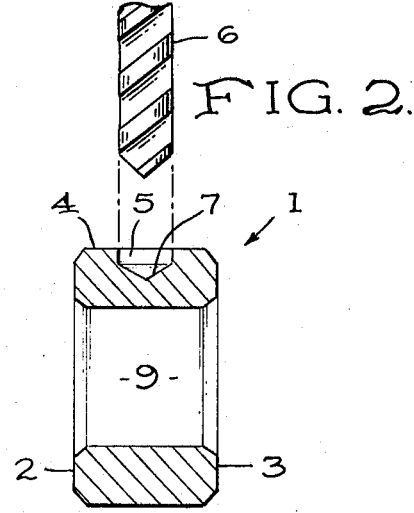
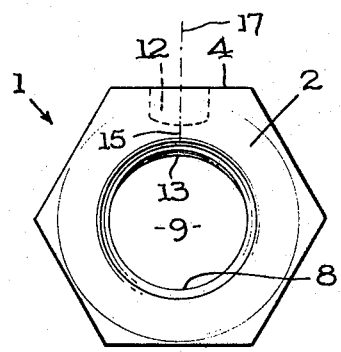
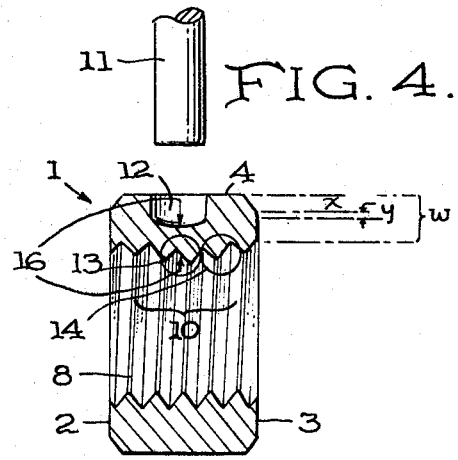
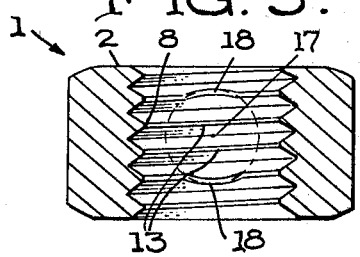
INVENTOR
DONALD A. FISCHER
EDWARD H. NADENSEK
BY
ATTORNEY 3,481,379
LOCK NUT
Donald A. Fischer, Berea, and Edward H. Nadensek, Brookpark Village, Ohio, assignors to Republic Steel Corporation, Cleveland, Ohio, a corporation of New Jersey
Filed Nov. 24, 1967, Ser. No. 685,672
Int. Cl. F16b *39/28;* B21d *53/24*
U.S. Cl. 151—21                                4 Claims

ABSTRACT OF THE DISCLOSURE

A self-locking fastener comprising a threaded nut having a drilled cavity in the sidewall and a staked area at the bottom thereof providing a localized distorted thread form including medial radially displaced threads and outer axially displaced threads.

---

This invention relates generally to self-locking fasteners, and more particularly, to an improved lock nut having a localized distorted thread form.

In any fastening member of the present type, wherein distortion of the threads thereof provides the self-locking characteristic, production control of this distortion and the attendant torque value is of paramount concern. Many approaches have been made to the problem. A well known self-locking fastener has been produced by the application of a compressive force to the opposite sidewalls of a nut blank thereby to provide a substantially elliptical configuration in the thread bore. A primary shortcoming of such a lock nut is the inability to satisfactorily control the thread deformation and the resultant torque value, particularly the prevailing torque as such a lock nut is repeatedly applied and removed from a bolt. Also, the resultant deformation of the exterior of the nut blank must be contended with.

Accordingly, other attempts have been made to more accurately control the thread distortion. One such example is wherein the threads of a nut blank are radially distorted only adjacent one end thereof. However this type of nut presents another problem when considering high speed assembly situations involving automatic feeding apparatus since such a locking fastener may only be applied to a bolt with one particular end face thereof presented to the bolt as the locking action is affected only from one end of the nut.

By the present invention a self-locking nut is provided wherein a distorted thread form is localized in a predetermined medial area of a sidewall to provide a torque value of ultimate reliability. Most importantly, the present invention includes an elastic area integral with the nut body and adjacent the distorted portion of the threads. It is by this provision that superior results are achieved in the use of the lock nut. It is well known that many prior locking nuts having distorted thread portions produce objectionable damage to the threads in galling upon use with the juxtaposed bolt member. This galling is directly attributable to the interference fit existing between such a lock nut and bolt due to the inward radial displacement of the minor diameter of the lock nut. Accordingly, other types of lock nuts have sought to avoid any such inward displacement of the minor diameter of the lock nut in order to preclude this galling. One such solution has been to utilize a nonmetallic insert within the thread bore of the lock nut to provide the self-locking feature while another approach involves an attempt to provide for localized thread distortion wherein the threads are displaced only axially of the thread bore and there is no inward radial displacement.

Accordingly, one of the primary objects of the present invention is to provide an improved lock nut which overcomes the previously mentioned disadvantages and provides a unique locking action with substantially no galling and results in an easily controllable torque range which is maintained even after repeated applications.

Another object of the present invention is to provide a lock nut having a distorted thread form disposed in a localized area spaced from both end faces of the nut blank.

Still another object of the present invention is to provide a lock nut having an integral localized elastic area in the sidewall thereof disposed radially adjacent a plurality of distorted threads.

Another object of the present invention is to provide a lock nut having a localized distorted thread form comprising both radially and axially displaced thread crests without any distortion of the exterior of the nut blank.

A further object of the present invention is to provide a lock nut having a distorted thread form and including at least one sidewall provided with a predrilled cavity partially extending radially through the sidewall, the bottom of which cavity is staked radially inwardly to provide an elastic area adjacent the distorted thread form.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing in which:

FIGURE 1 is a top plan view of a lock nut according to the present invention subsequent to the predrilling of a cavity in the sidewall thereof.

FIGURE 2 is a side sectional view of the nut blank of FIGURE 1.

FIGURE 3 is a plan view of a completed lock nut according to the present invention.

FIGURE 4 is a side sectional view of the lock nut of FIGURE 3.

FIGURE 5 is a sectional view of the completed lock nut according to the present invention illustrating the distorted thread form in elevation.

Similar reference characters designate corresponding parts throughout the several views of the drawing.

Referring now to the drawing, particularly FIGURE 1, the nut blank, generally designated 1, will be seen to comprise a conventional cold formed hexagonal member having opposite parallel end faces 2 and 3 of similar configuration although it will be understood that the present invention is not limited to a nut blank of any one particular design.

The novel localized distorted thread form of the present invention is produced by a series of two sequential operations formed upon at least one sidewall 4 of the nut blank. The first operation comprises the predrilling of a cavity into the outer surface of one of the sidewalls, 4, as shown in FIGURES 1 and 2 of the drawing. The cavity 5 is preferably centered with respect to both the lateral edges of the sidewall 4 and the two opposite end faces 2 and 3 in order to assure a maximum controllability of the resultant torque values to be achieved and also to permit adaptability of the lock nut to automatic machine assembly upon threaded bolts by application from either end face 2 and 3.

The cavity 5 is produced by means of a conventional twist drill 6 applied to the outer surface of the sidewall in a direction perpendicular thereto such that the longitudinal axis of the cavity 5 will be radial with respect to the center axis of the nut blank 1. As will be apparent after considering all of the features involved in the present invention, the diameter of the drill 6, as well as the depth of the cavity bottom wall 7, with respect to the overall radial thickness of the sidewalls of the blank, may be varied in order to achieve various torque values in the completed lock nut.

The nut blank 1 is provided with any suitable thread form 8 extending from one end face 2 to the other end face 3 according to the customer's specification. These threads 8 are produced by any conventional tapping means and may be formed in the bore 9 of the blank 1 following the aforedescribed predrilling operation or subsequent thereto. In any event it will be understood that the tapping operation precedes the subsequent staking operation shown in FIGURE 4 of the drawing.

The distorted thread form 10 illustrated in FIGURES 3-5 is disposed radially inwardly from the side-wall 4 having the previously provided cavity 5 therein. The novel localized distorted thread form 10 of the present invention is formed by means of a staking pin or punch 11 having an outside diameter permitting a sliding fit of the staking pin within the previously formed cavity 5. The free end of the staking pin 11 is inserted within the cavity 5 and a single blow is applied thereto in a radial direction with respect to the center axis of the nut blank 1 in order to displace the material of the sidewall 4 between the cavity bottom wall 7 and the radially adjacent threads 8 of the nut blank. As preferably practiced, the actual depth of the resultant indentation 12 within the sidewall 4 will be less than twice the former depth of the drilled cavity 5 or, stated alternatively, the staking depth is less than the drilled cavity depth. This relationship is illustrated in FIGURE 4 wherein the depth of the drilled cavity is represented by $x$ while $y$ indicates the staked depth and the full thickness of the sidewall is shown by $w$. It will be understood that the necessary staking pressure will be less than would be required in other types of lock nuts wherein the staking is performed upon the outer nut wall and thus in the present instance there is a much more limited range within which any errors can occur.

The result of the predrilled and staked indentation 12 is a novel localized distorted thread form 10 comprising portions 13 of one or more radially distorted thread crests and roots in the vicinity immediately adjacent or most closely aligned with the center axis 17 of the indentation 12 and a displacement of the outlying portions 14 of adjacent thread crests or roots in a biased direction relative to axis 17 toward the respective end faces 2 and 3 of the nut blank. The outermost threads of the adjacent group of disturbed thread portions are given a pronounced longitudinal deviation 18, as best viewed in FIGURE 5, and in opposite axial directions. The former is most clearly shown in FIGURES 3 and 4 while the latter will be apparent in FIGURE 5. This dual thread distortion will be seen to be entirely confined within a localized area adjacent the sidewall having the predrilled and staked indentation 12.

A primary advantage in the above described formation of the distorted thread form 10 is the presence of an integral elastic area 15 intermediate the bottom of the indentation 12 and the adjacent distorted threads. The elastic area or portion is the result of defining a sectional thickness 16 suited to the ductility of the metal so that a slight resilient action ensues. It will thus be apparent that during the staking operation, there is no distortion of the peripheral portion of the blank 1, thus enhancing the utilization of the present lock nut with automatic feeding and wrenching apparatus, not to mention the more positive control which may be had over the selected torque values. The foregoing is possible only because no compressive force is applied directly to the exposed outer face of the sidewall 4 of the nut blank, but rather all of the staking force is directed to the previously formed cavity bottom wall 7 which is displaced inwardly and the internal threaded wall 8 is thereby given a "hump" resulting in radial displacement of that portion of the threads most closely aligned with the axis of the tap hole and a bias or slight axial displacement of that portion of the threads most closely aligned with the periphery of the tap hole. This herein described arrangement precludes any galling during the subsequent application of the present lock nut 4, even though the minor diameter of the thread form in the axially medial portion of the threads 8 is displaced inwardly to provide for interference, as the resulting interference fit is sufficiently elastic to yield during engagement with a threaded bolt.

We claim:

1. A prevailing torque lock fastener comprising, a nut blank having a sidewall, axial bore and opposite end faces, said bore provided with internal threads extending substantially the length thereof, said threads of regular configuration throughout said bore except for at least one localized distorted thread form medially disposed in spaced relation from said end faces, said sidewall having a radially extending and outwardly opening cavity of a diameter encompassing a width of no less than three of said threads and radially aligned with said localized distorted thread form, an imperforate compressed body portion at the bottom of said caviy having a lateral extent no less than the lateral dimension of said cavity providing an elastic area of substantial radial thickness in said sidewall radially aligned between said cavity and said localized distorted thread form, and said localized distorted thread form includes at least one portion of a thread helix displaced substantially radially into said bore adjacent the central radially extending axis of said cavity and said elastic area, and a portion including the crest of at least one thread helix outwardly adjacent each side of said radially displaced thread helix displaced in part axially with respect to the axis of said bore, towards the closest of said end faces, whereby, said fastener may be repeatedly applied to a complementary threaded member without significant decrease in torque value as said elastic area is repeatedly displaced.

2. A self-locking fastener, according to claim 1, wherein, the radial thickness of said elastic area is no greater than one-half the sidewall thickness.

3. A method of making a prevailing torque lock fastener from a blank having an axial bore, comprising the steps, tapping said blank bore to provide uniform internal threads, drilling a radially extending cavity having a generally conical bottom wall in the outer surface of the sidewall of said blank to a depth substantially less than the radial thickness of the blank sidewall, inserting a complementary staking pin provided with a blunt generally flat lower end into said cavity, and applying axial pressure to said pin to compress the material of said sidewall between the bottom of said cavity and said threads to substantially flatten said cavity angular bottom wall and to radially displace portions of said threads in the area adjacent the central portion of said compressed sidewall while axially displacing portions of said threads outwardly adjacent each side of said radially displaced thread portions to provide an imperforate elastic area of substantial thickness and including said radially and axially displaced thread portions.

4. A method of making a prevailing torque lock fastener from a blank having an axial bore, comprising the steps, drilling a radially extending cavity having a generally conical bottom wall in the outer surface of the sidewall of said blank to a depth substantially less than the radial thickness of the blank sidewall, tapping said blank bore to provide uniform internal threads, inserting a complementary staking pin provided with a blunt generally flat lower end into said cavity, and applying axial pressure to said pin to compress the material of said sidewall between the bottom of said cavity and said threads to substantially flatten said cavity angular bottom wall and to radially displace portions of said threads in the area adjacent the central portion of said compressed sidewall while axially displacing portions of said threads outwardly adjacent each side of said radially displaced thread portions to provide an imperforate elastic area of substantial thickness and including said radially and axially displaced thread portions.

References Cited

UNITED STATES PATENTS

| | | |
|---|---|---|
| 3,029,856 | 4/1962 | Abbott. |
| 3,103,962 | 9/1963 | Neuschotz. |
| 3,311,147 | 3/1967 | Walker. |

FOREIGN PATENTS 544,316   4/1942   Great Britain.

EDWARD C. ALLEN, Primary Examiner

U.S. Cl. X.R.

10—86